United States Patent [19]
Hehl

[11] Patent Number: 5,980,793
[45] Date of Patent: Nov. 9, 1999

[54] PROCESS FOR DETERMINING THE FORCES ARISING IN AN INJECTION MOLDING MACHINE AND A DEVICE FOR CARRYING OUT THE PROCESS

[76] Inventor: Karl Hehl, Arthur-Hehl-Str. 32, D-72290 Lossburg, Germany

[21] Appl. No.: 08/983,414
[22] PCT Filed: Jul. 2, 1996
[86] PCT No.: PCT/DE96/01220
 § 371 Date: Jan. 9, 1998
 § 102(e) Date: Jan. 9, 1998
[87] PCT Pub. No.: WO97/02941
 PCT Pub. Date: Jan. 30, 1997

[30] Foreign Application Priority Data

Jul. 11, 1995 [DE] Germany .......................... 195 25 142

[51] Int. Cl.[6] .............................. B29C 45/77; B29C 45/76
[52] U.S. Cl. .................... 264/40.1; 264/328.1; 425/145; 425/149; 425/170; 73/1.59
[58] Field of Search .................. 264/40.1, 40.5, 264/40.7, 328.1; 425/145, 149, 170; 73/1.62, 1.63, 1.59; 364/475.08, 475.09

[56] References Cited

U.S. PATENT DOCUMENTS 4,086,804  5/1978  Ruby .
4,961,696  10/1990  Yamamura ............................ 425/149

FOREIGN PATENT DOCUMENTS

| 0130769 | 1/1985 | European Pat. Off. . |
| 0331735 | 9/1989 | European Pat. Off. . |
| 0436732 | 7/1991 | European Pat. Off. . |
| 0513774 | 11/1992 | European Pat. Off. . |
| 0644030 | 3/1995 | European Pat. Off. . |
| 3939728 | 6/1991 | Germany . |
| 4446857 | 6/1995 | Germany . |
| 1-320126 | 12/1989 | Japan . |

*Primary Examiner*—Jill L. Heitbrink
*Attorney, Agent, or Firm*—Venable; George H. Spencer; Ashley J. Wells

[57] ABSTRACT

For determination of the forces arising at a feeding means in an injection molding machine for plastic materials, a first static sensor is provided for determining at least the forces arising during the material preparation stage. A further force sensor detects in essence the forces arising during injection and, as soon as the first measured value reaches a limit value F1, the first static sensor passes on the further detection of the forces to the further sensor, wherein the limit value F1 at the same time serves as calibration value for the further sensor.

9 Claims, 6 Drawing Sheets

PROCESS FOR DETERMINING THE FORCES ARISING IN AN INJECTION MOLDING MACHINE AND A DEVICE FOR CARRYING OUT THE PROCESS

TECHNICAL FIELD

The invention concerns a process for determining the forces arising in a feeding means in an injection moulding machine for processing plastifiable materials such as plastics, powders and ceramic masses according to the preamble of claim 1, as well as a device for carrying out the process according to the preamble of claim 7.

BACKGROUND OF THE INVENTION

Prior Art 1.

Processes and devices like that are for example known from DE-A 44 46 857. In these usually one material pressure sensor is provided in the nozzle and one in the mould cavity, the results of which certainly are input in the control, as for the rest, however, do not correlate with each other. As soon as the measured value of the internal mould pressure, for example after sealing the moulding, is not available anymore, this also is not available as input parameter anymore.

In order to determine the closing force more precisely, in DE-A 39 39 728 two pressure measuring systems are provided, one of which is assigned to the mould cavity and one to the mould parting plane. For the closing force determination there is, however, only one sensor available.

Another possibility for determining the force in a hydraulic injection molding machine according to EP-A 644 030 consists in detecting the forces on both sides of the injection piston and to subtract them one from the other. Such a force measurement, however, does not consider the losses which might occur between the feeding means and the injection piston.

For determination of the internal mould pressure, according to EP-A 130 769, several sensors can be provided in both mould parts, which however are not designed for measuring different force ranges.

Mostly static sensors are provided for determination of the injection forces arising during the injection cycle in the bedding area of the feeding means, as for example, a feed screw, in EP-B 331 735 for example. The measured values gained from that usually are input in a force- or pressure-dependant injection control, provided that measured values of the internal mold pressure can be detected sufficiently or due to the material used can be detected reliably from a determined time during the injection cycle.

From EP-B 436 732 it is furthermore known to arrange a pressure sensor for the same purpose in the area of the feed screw itself.

The known devices, however, have the problem, that the injection force in an injection molding machine during the real injection ranges in a very high area of mostly several tons. On the other hand during the dosing process, on the material preparation stage, the resolution should range only in the kilogram area. Static force transducers, however, now can measure continuously starting from a zero point up to the high forces without loosing their zero point, but they do not dispose, just in the lower area, of the desired resolution or, if they do so, they are not suited to measure high forces.

In order to solve this problem, nowadays expensive so-called dynamic force transducers are used as sensors. However, they have the disadvantage, that their reliable application requires, that a reset must be possible sometime during the course of the cycle. Without this reset the sensor drifts away and leaves its zero position. Since at no time during the injection process in an injection molding machine for plastics is a defined force zero condition reached, this reset cannot be achieved without the danger of building-up.

SUMMARY OF THE INVENTION

Based on this state of the art the present invention has the object to provide reliable measured values, which satisfy the respective requirements on the resolution during the whole injection cycle.

This object is solved by a process for determining forces acting on a feeding means in an injection molding unit of an injection molding machine with at least one first sensor which detects a pressure acting on the feeding means from the material to be processed as a first measured value and a further sensor which detects forces arising during the injection process as a second measured value where the at least one first sensor is a static sensor and that once the first measured value reaches a limit value lying within the measurement range of the first sensor, the first sensor transfers the further detection of forces to the further sensor and the limit value is used as a calibration value for the further sensor. The object of the invention is also solved by a device for carrying out the above process.

This is done by providing two different systems. A first system with a static sensor determined with respect to its zero position is responsible for a small range of the measurement. However, the first system at from a certain measured value passes the measurement to a second system having a further sensor, which is adapted to detect also the higher forces. At the transfer point and at the same time of system transfer the further sensor is calibrated. This way the static sensor with a high resolution is applicable in the dosing area, without having to fear, that it can be destroyed by higher injection forces. At the same time the demands on a long lasting and reliable measured value determination are complied with, because a determined force value is always given at the transfer point, which if necessary can serve as calibration point for the further sensor.

DETAILED DESCRIPTION OF THE PREFERRED EMBODIMENTS

The invention will now be described in more detail by example with reference to the enclosed Figures. Though the embodiments are merely examples, which should not limit the inventive concept to any particular physical configuration.

Figure 1:
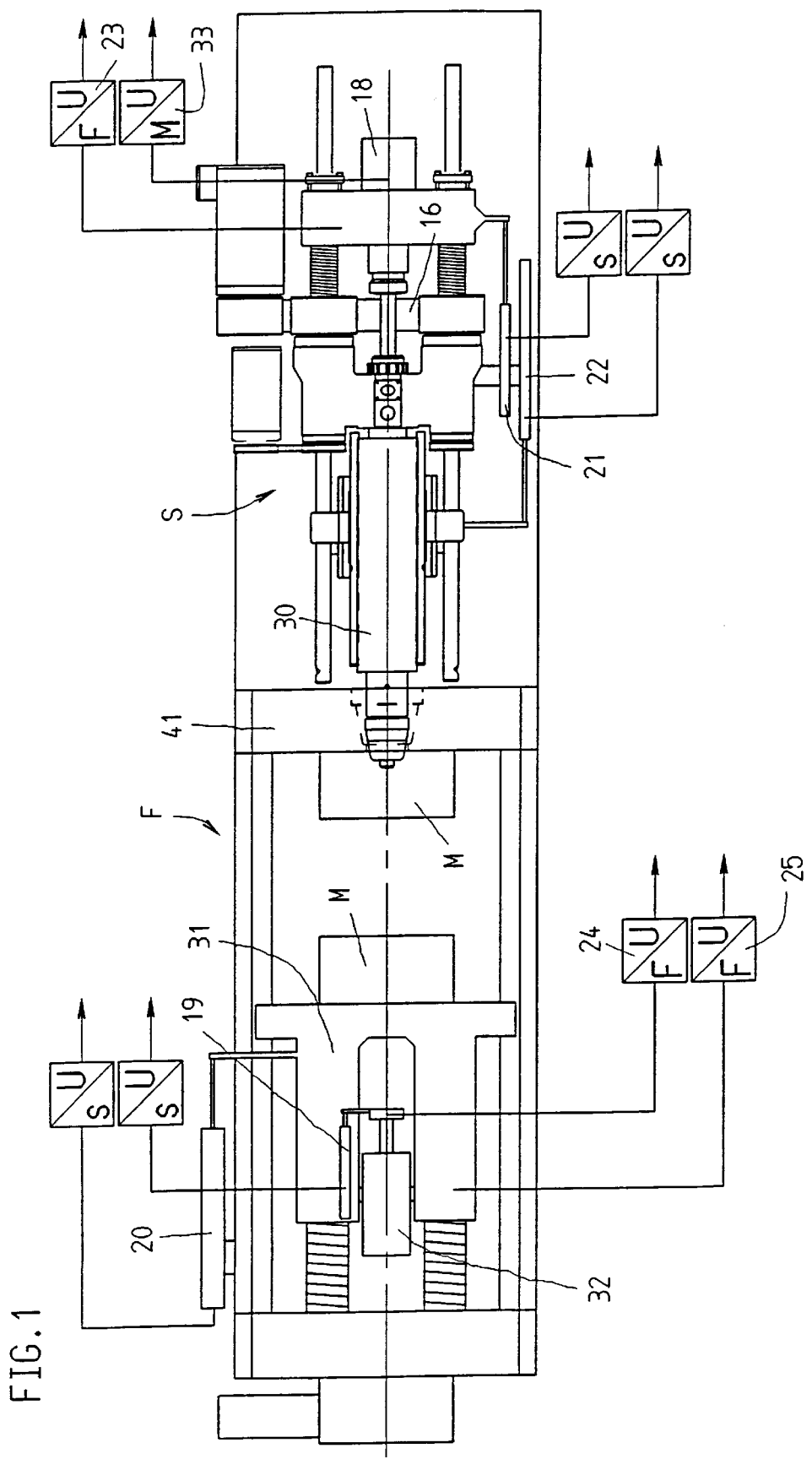
FIG. 1 is a top plan view on an injection molding machine for plastic materials.
Figure 2:
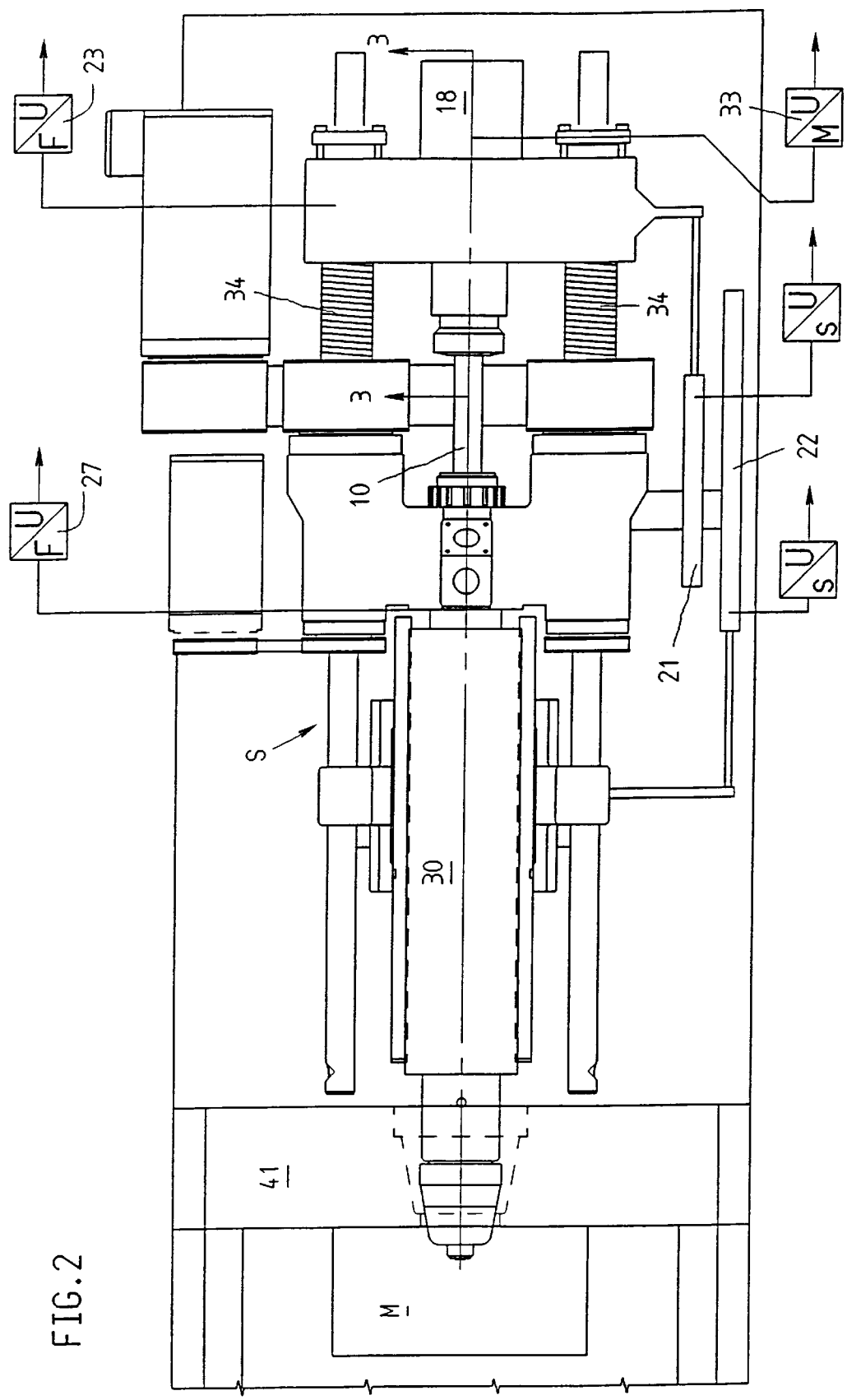
FIG. 2 is an enlarged view of the injection molding unit from FIG. 1.

FIG. 1 represents schematically an injection molding machine having molds M for plastic materials, showing on the left side a mold closing unit F having an injection unit 32 and on the right side an injection molding unit S with a plastifying unit 80. In the embodiment of FIGS. 1-2 an electro-mechanically driven injection molding unit is shown, in which, for example, the injection molding unit is moved via spindles 34. A closing mechanism 31, which in this embodiment is also moved via spindles, is assigned to the mould closing unit F, however, other electro-mechanical driving mechanisms, as well as other kinds of drives such as hydraulic, pneumatic or the like can be provided on the mold closing side or on the injection molding side. Force transducers 24, 25 transmit signals corresponding to the movement of closing mechanism 31. Absolute distance measuring systems are assigned to both sides of the injection molding machine. On the mold closing side absolute distance measuring systems 19, 20 are provided in the form of linear potentiometers, the values of which are passed via a distance potential transformer to a superset control unit, not represented graphically. On the injection molding side a linear potentiometer as absolute distance measuring system 22 is provided with an associated distance potential transformer for attaching the nozzle of plastifying cylinder 31 to the stationary mold carrier 41. An absolute distance measuring system 21 is provided. in the form of a linear potentiometer with an associated potential transformer for the movement of the feed screw. In the present case a feed screw designed as feeding means 10 is moved via a rotational drive 18 and a force transducer 23 transmits signals corresponding to the movement of feed means 10. A torque transformer 33 is assigned to the rotational drive.

Figure 3:
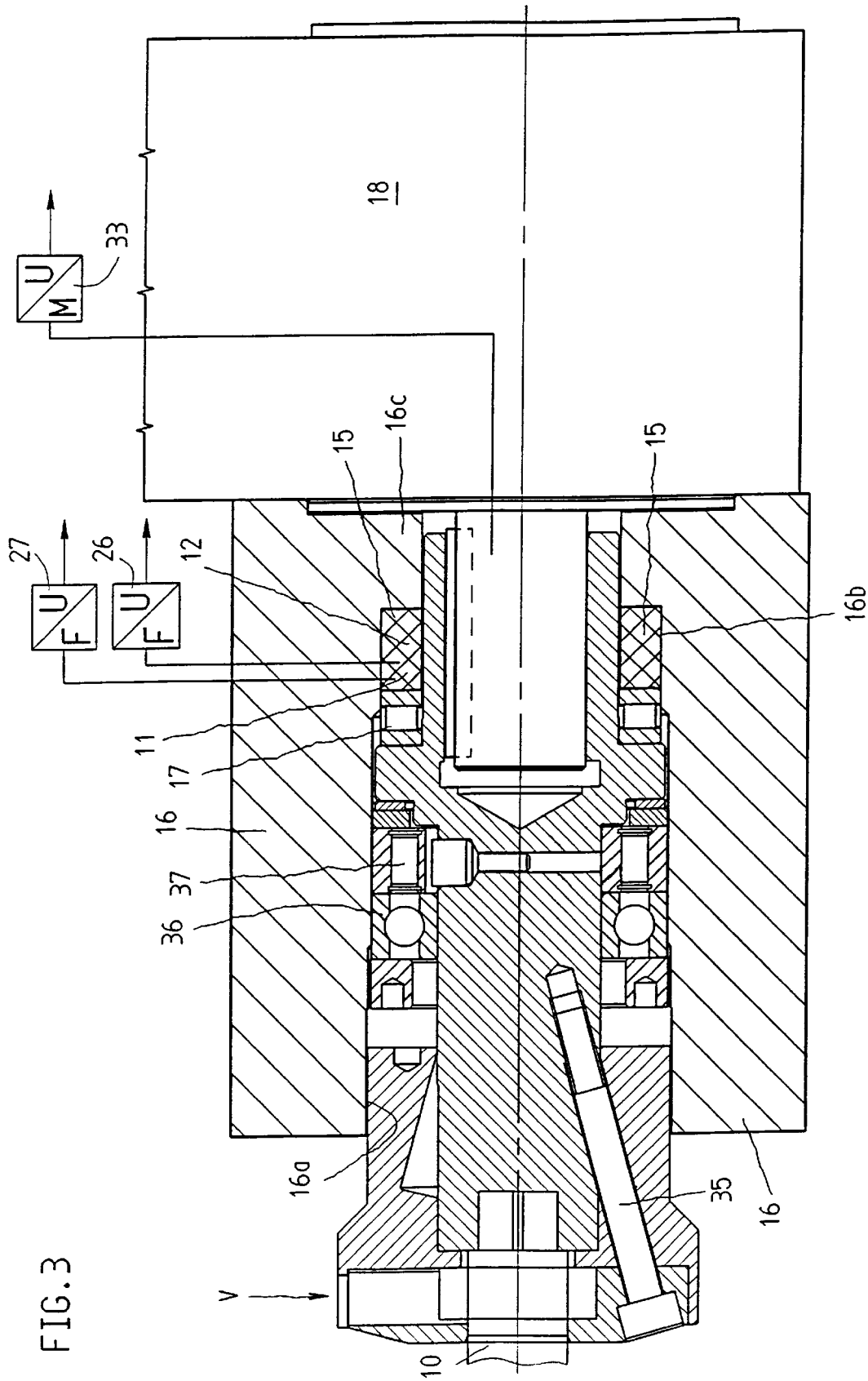
FIG. 3 is a section according to line 3—3 of FIG. 2.

FIG. 3 shows in an enlarged section of the bedding area for the feeding means 10. In this case on the left side a locking mechanism can be seen, which is in connection with the shaft 18a of the rotational drive 18 via fixing means 35. With reference to a detailed embodiment of this locking mechanism one is referred to DE-C 42 36 282.

In a bore hole 16a of the injection bridge 16 this shaft 18a is run on bearings 36, 37. The rotational motor 18 is arranged on the side of the injection bridge 16 opposite to the stationary mold carrier 41. At the bottom of the bore hole 16a a recess 16b is provided, which in the present case receives a force measuring ring 15. Two sensors are located in the force measuring ring, wherein the values detected by these sensors are transmitted to the control unit via the force potential transformers assigned to the force transducers 26, 27. A force measuring ring 15 of such a kind is useful above all, if a static and a dynamic sensor are provided, since in this case they can be easily integrated in the force measuring ring 15. The first static sensor 11 serves for detecting the low forces arising during the dosing and the material preparation stage in the injection moulding unit S in a lower measuring range B1, whereas the dynamic sensor 12 works in the remaining measuring range B2, which is described in more detail below. The force measuring ring 15 is arranged between the axial pressure bearing 17 and the forming 16c of the injection bridge 16 in a way that it encloses the driving shaft 18a of the rotational drive 18.

Figure 4:
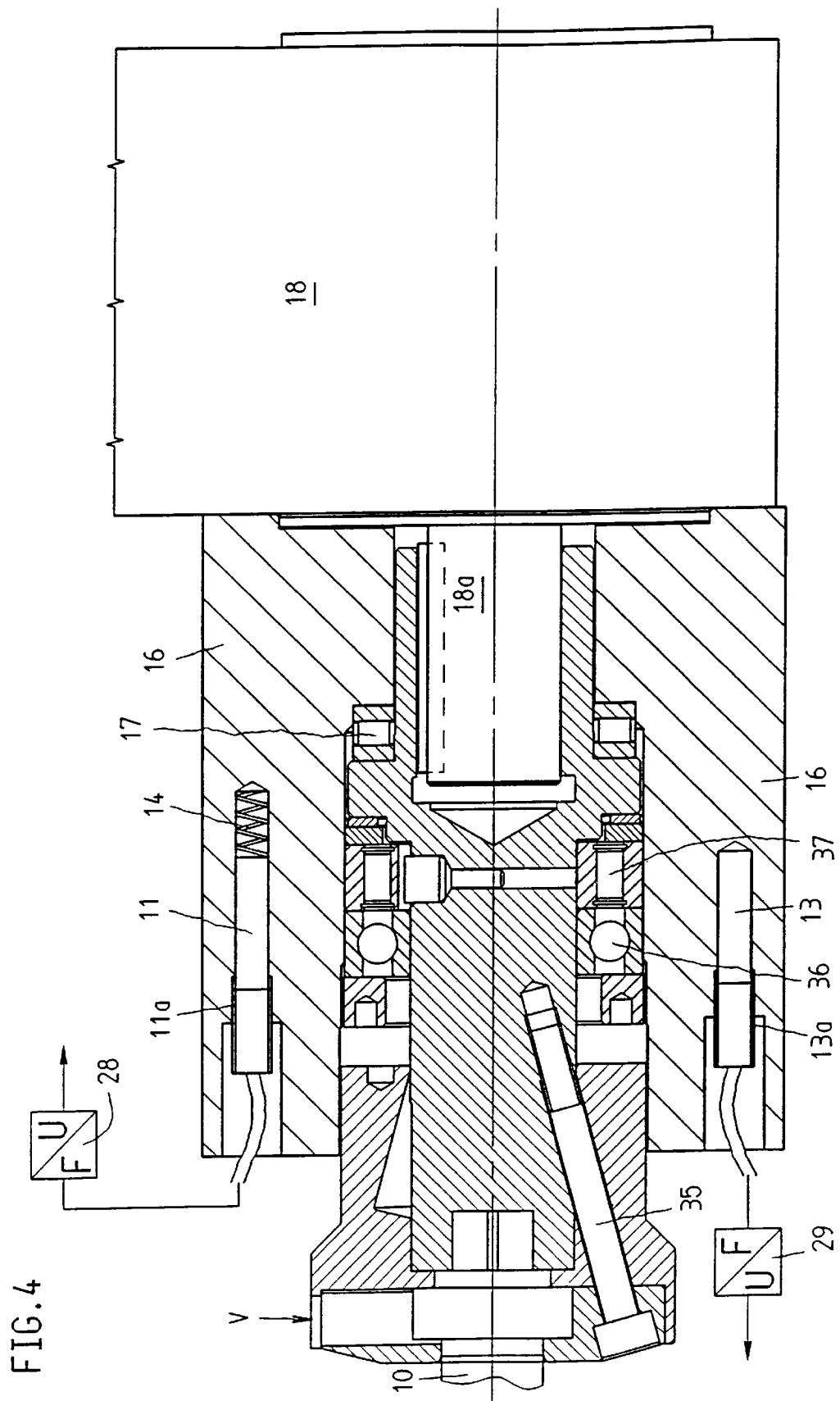
FIG. 4 is a representation according to FIG. 3 in a further embodiment.

Alternatively an embodiment according to FIG. 4 is possible. Here a first static sensor 11 is provided, which is spring-loaded by a spring 14. This sensor and also a second static sensor 13 are screwed in the injection bridge 16 by thread sections 11a, 13a, so that deformations of the injection bridge 16 act upon the sensors and can be used for the measured value determination of the arising forces. The force of the spring 14 has a degressive course and is coordinated with a limit value F1 in such a way that when this limit value is exceeded, the first static sensor 11 is decoupled from the force flux in that the spring prevents a further loading of the sensor. In this way a destruction of the sensor 11 at a maximum injection force is prevented. Spring 14 acts in this embodiment like a bypass.

The first static sensor 11 thus covers a measuring range B1 of lower forces of, for example, 1% up to 25% of the maximum injection force, preferably a measuring range which usually is not exceeded during the dosing. In the higher measuring range B2 a further sensor works as second static sensor 13. The first static sensor 11 transmits a signal via the force transducer 28 and the second static sensor 13 a signal via the force transducer 29 to the control unit screw 38. The sensors in this case can be designed as wire resistant strain gauges. In both cases the sensors can be adjusted respectively and prestressed correspondingly, in order to be able to measure tensile forces as well as pressure forces. That way it is granted, that a supervision with respective closed loop or open loop control is possible during the whole injection cycle.

The sensors detect the forces arising at the feeding means 10 of the injection unit S, which are characteristic for a pressure acting from the material to be processed on the feeding means 10, for example as input signal for a closed loop injection control. At least one first static sensor 11 has a high resolution and serves in essence to detect in the form of a first measured value the forces arising during the material preparation stage in the injection moulding unit S. A further force sensor in the form of a second static sensor 13 or a dynamic sensor 12 is assigned to the first static sensor 11, which essentially detects in the form of a second measured value the forces arising during injection. A switching or transfer takes place at a transfer point P (FIG. 6), as soon as the first measured value reaches a limit value F1 lying in the measuring range of the first static sensor 11. At the transfer point P the first static sensor 11 transfers for example at time $t_{01}$ the further force detection to a further sensor, wherein at this point the force is determined by the first measured value, so that at the same time the further sensor can be calibrated or zero-setted. Thus, especially for the dynamic sensor 12 a start- or zero point is obtained, so that in each injection cycle the dynamic sensor is reset and a drifting away of the measured value of the respective sensor signal is avoided. The dynamic sensor 12 or the second static sensor 13 is then, however, adapted to detect the high injection forces in contrast to those arising during the material preparation.

Figure 5:
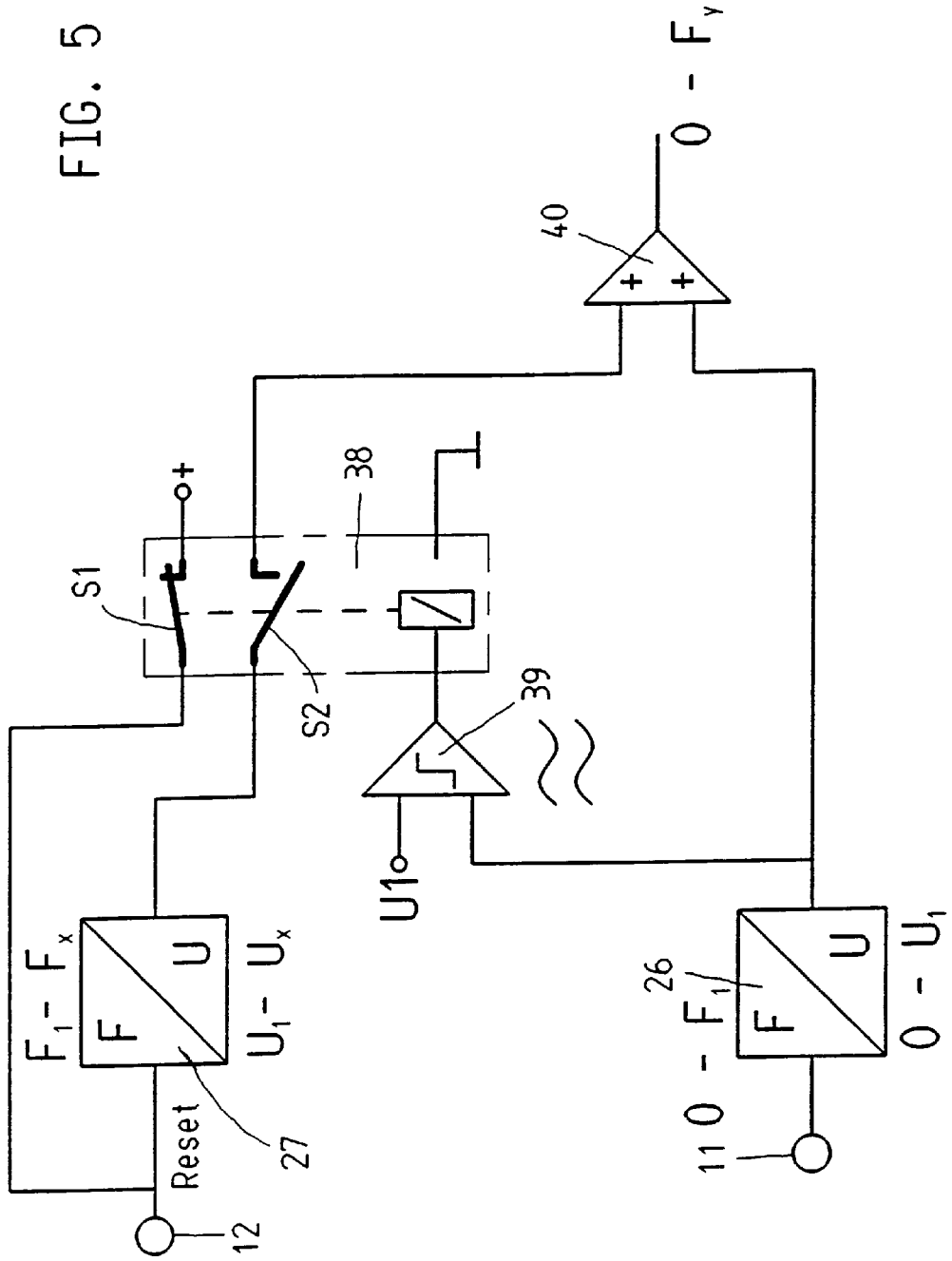
FIG. 5 is a wiring diagram for the wiring of the sensors.
Figure 6:
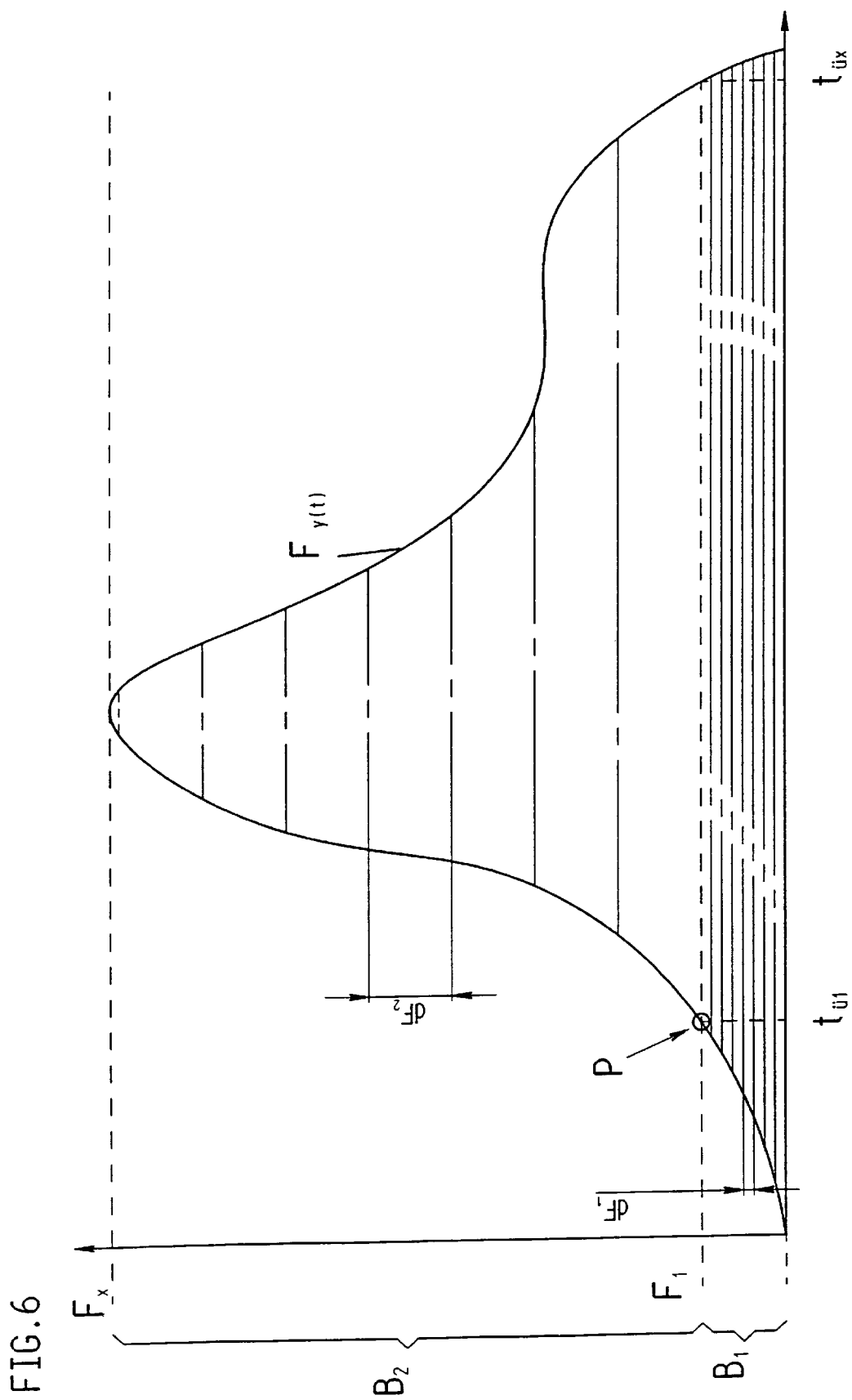
FIG. 6 is the force course during the injection process.

FIG. 5 shows the function of the application of the two sensors shown in the FIGS. 3 and 4. The first static sensor 11 supplies a measured value via the force transducer 26, which is passed on to the comparator 39 and there is compared with the reference value corresponding to the limit value F1. According to the result of this comparison the second measured value of the dynamic sensor 12 still is not switched on. In this case the switches S1, S2 are in a position according to the scheme. Thus only the first measured value detected by the first static sensor 11 is sent to the summarizer 40. If the limit value F1 is reached, the control means 38 transmits a signal to the switches S1, S2. Thus the switch S1 is opened and the force transducer 27 leaves the reset condition. From now on the dynamic sensor 12 also delivers a second measured value via the force transducer 27 to summarizer 40. Now two measured values are provided to the summarizer 40, which are added one with one another, so that from limit value F1 up to the maximum injection force Fx a continuous measuring result from zero to Fx is achieved. This leads to the required range divisioning. FIG. 6 illustrates the higher resolution dF1 in the lower measuring range B1 of the first static sensor acting there, as compared with the lower resolution dF2 of the further sensor in the upper range. In the example of FIG. 3 this evaluation logic is located in the force measuring ring 15, so that the control is relieved of this decision. In FIG. 4 the evaluation logic is located in the switch cabinet, which is not represented graphically.

If two static sensors are used, one of the sensors for example covers the measuring range of lower forces as for example of the first 10%, whereas the second sensor covers the remaining measuring range. Thus in the area of dosing or material preparation stage the relatively low force can be regulated very precisely and at a reasonable price with the high resolving sensor, which, however, only must be adapted for a determined measuring range. For the area of higher forces the further sensor is available, which also only is determined for this higher area and insofar also works with a lower resolution. In order to avoid a destruction of the sensor working in the low force area, the first static sensor 11 this is beared movably against the force of a spring 14.

From FIG. 6 a corresponding measuring range divisioning can be learned. The static sensor 11 works in the measuring range of the force F from zero to F1, whereas the further sensor works in the range above the predetermined limit value F1 up to the maximum injection force Fx. At time $t_{01}$, the transfer takes place at the transfer point and in the whole following range until time $t_{0x}$ the force is detected essentially by the further sensor in the form of the force-time-course Fy (t). After the time $t_{0x}$ the 'work' is passed on again to the first static sensor 11.

I claim:

1. A process for determining forces acting on a feeding means in an injection molding unit of an injection molding machine, said forces representing pressure which acts from a material to be processed on the feeding means and said injection molding machine having at least one first sensor having a measurement range and a further force sensor which detects the forces arising during an injection process as a second measured value, wherein the at least one first sensor is a static sensor and that once a measured value of the at least one first sensor reaches a limit value lying within the measurement range of the at least one first sensor, the at least one first static sensor transfers further defection of the forces to the further force sensor, said limit value being used as a calibration value for the further force sensor.

2. A process according to claim 1, wherein the limit value constitutes the starting point for the force detection of the further force sensor.

3. A process according to claim 1, wherein the limit value is higher than the forces usually arising in the injection molding unit during a material preparation stage.

4. A process according to claim 1, wherein the further force sensor is a dynamic sensor, the dynamic sensor being zero-set when the at least one first sensor transfers the further detection of the forces to the further force sensor.

5. A process according to claim 1, wherein the further force sensor is a second static sensor which detects higher forces during an injection process.

6. A process according to claim 1, wherein the first sensor is decoupled against the force of a spring from the force flux, when the limit value is exceeded.

7. A device for determining forces acting on a feeding means in an injection molding unit of an injection molding machine, said force representing pressure which acts from a material to be processed on the feeding means and said injection molding machine having at least one first sensor and a further force sensor which detects the forces arising during an injection process as a second measured value, wherein the at least one first sensor is a static sensor and the further force sensor is a dynamic sensor, said sensors being incorporated in a force measuring ring which is arranged on an injection bridge of the injection molding unit between an axial pressure bearing and a forming, of the injection bridge, and wherein a determined limit value in a measuring range of the at least one static sensor calibrates the dynamic sensor.

8. A device according to claim 7, wherein the feeding means is a feed screw and that the force measuring ring encloses a drive shaft of a rotational drive for the feed screw.

9. A device according to claim 7, wherein the first static sensor is movably beared against the force of a spring, the spring force of which is coordinated to the limit value in such a way, that the first static sensor is decoupled from the force flux when the limit value is exceeded.

* * * * *